UNITED STATES PATENT OFFICE.

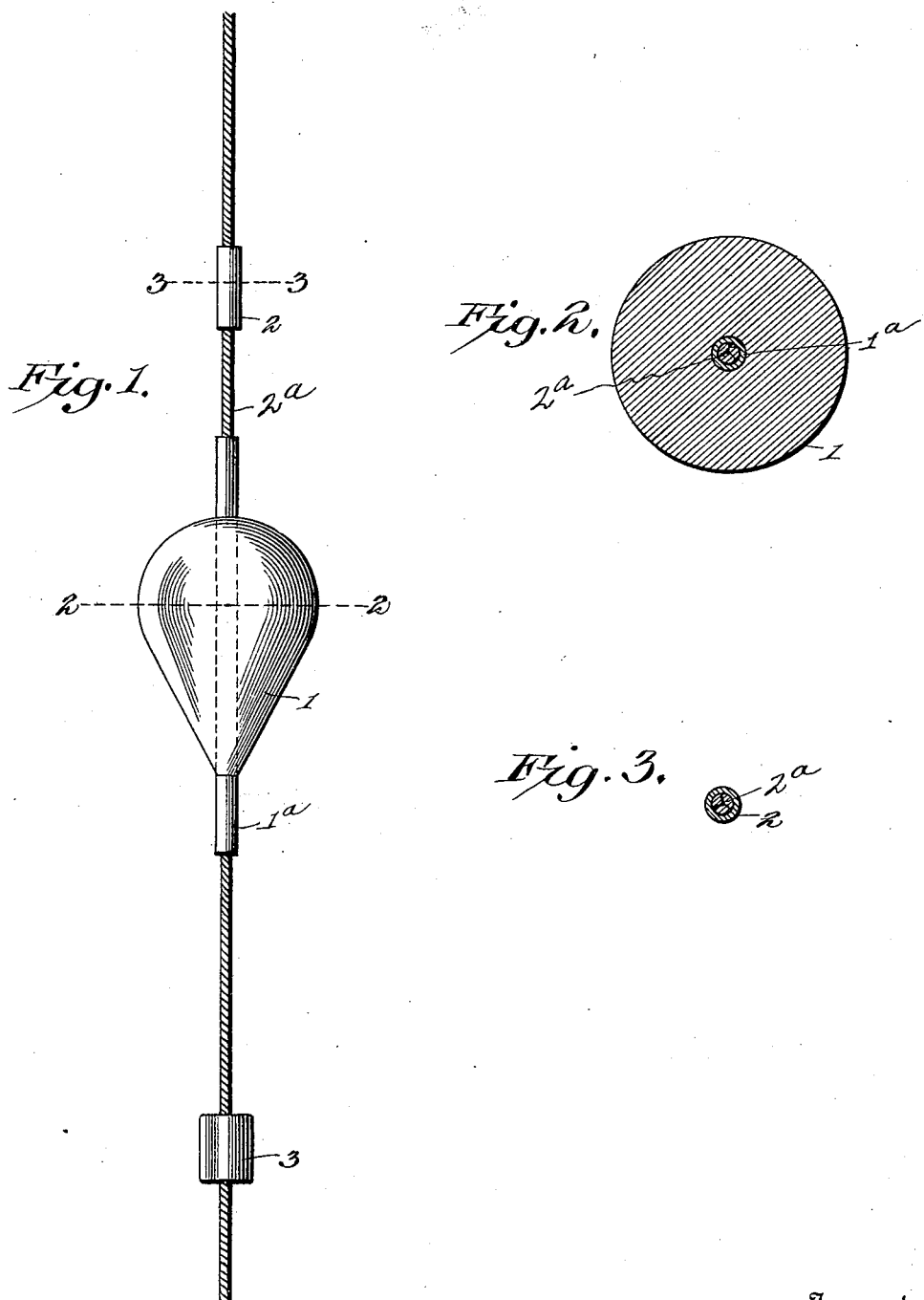

ADOLPHUS N. PACETTY, OF ST. AUGUSTINE, FLORIDA.

FISHING-FLOAT.

SPECIFICATION forming part of Letters Patent No. 691,407, dated January 21, 1902.

Application filed June 24, 1901. Serial No. 65,894. (No model.)

*To all whom it may concern:*

Be it known that I, ADOLPHUS N. PACETTY, a citizen of the United States of America, residing at St. Augustine, in the county of St. John and State of Florida, have invented certain new and useful Improvements in Modes of Using a Float for Fishing, of which the following is a specification.

This invention relates to fishing-tackle, and particularly to means for holding a float in certain relation to the sinker when the same is in use.

The object of the invention is to permit the float to pass down to the sinker in order to permit the line to be easily cast, and this will be found of great advantage when fishing in deep water, when, as a rule, the float is a considerable distance from the sinker.

By the use of this invention the float and sinker are together, and as the float strikes the water the line runs therethrough until a stop which is fixed on the line contacts with the float.

Furthermore, the object of the invention is to produce a float and in combination therewith a stop adjustable on the line, that the distance at which the float comes to rest may be regulated.

With the above and other objects in view the invention consists in the details of construction and in the arrangement and combination of parts to be hereinafter more fully set forth and claimed.

In describing the invention in detail reference will be had to the accompanying drawings, forming a part of this specification, wherein like characters denote corresponding parts in the several views, and in which—

Figure 1 is a view in elevation of a section of a line with the float, stop, and sinker applied. Fig. 2 is a sectional view on line 2 2 of Fig. 1. Fig. 3 is a sectional view on the line 3 3 of Fig. 1.

In the drawings, 1 indicates the float, having a tube $1^a$ run therethrough and projecting at the top and bottom. A stop 2 is secured on the line $2^a$, but is adjustable thereon, so that it may be stationed at any desired point. The line is free to run through the tube of the float, so that as the line is withdrawn from the water the float and sinker 3 will approach and be in such near relation that when the line is cast they will be together in their flight. As soon as the float strikes the water it will ride thereon, and the sinker, descending into the water, will draw the line through the float until the stop on the line abuts the tube of the float, when the parts will be in their proper position for use.

It will be observed that when the float is secured to the line in deep-water fishing it becomes difficult to cast the hook and weight, owing to the drag exercised by the float. By the arrangement just described this is effectually prevented, and both the hook and float may be cast.

Having thus fully described the invention, what I claim as new, and desire to secure by Letters Patent, is—

1. In a fishing-tackle, a float having a tube therethrough, a line run through the tube of the float and a stop on the line for limiting the movement of the line through the tube.

2. In a fishing-tackle, a float and in combination a line free to move through the float and means on the line for engaging the float.

ADOLPHUS N. PACETTY.

Witnesses:
HARRY A. JONES,
THOMAS P. DOWD.